United States Patent Office 3,184,986
Patented May 25, 1965

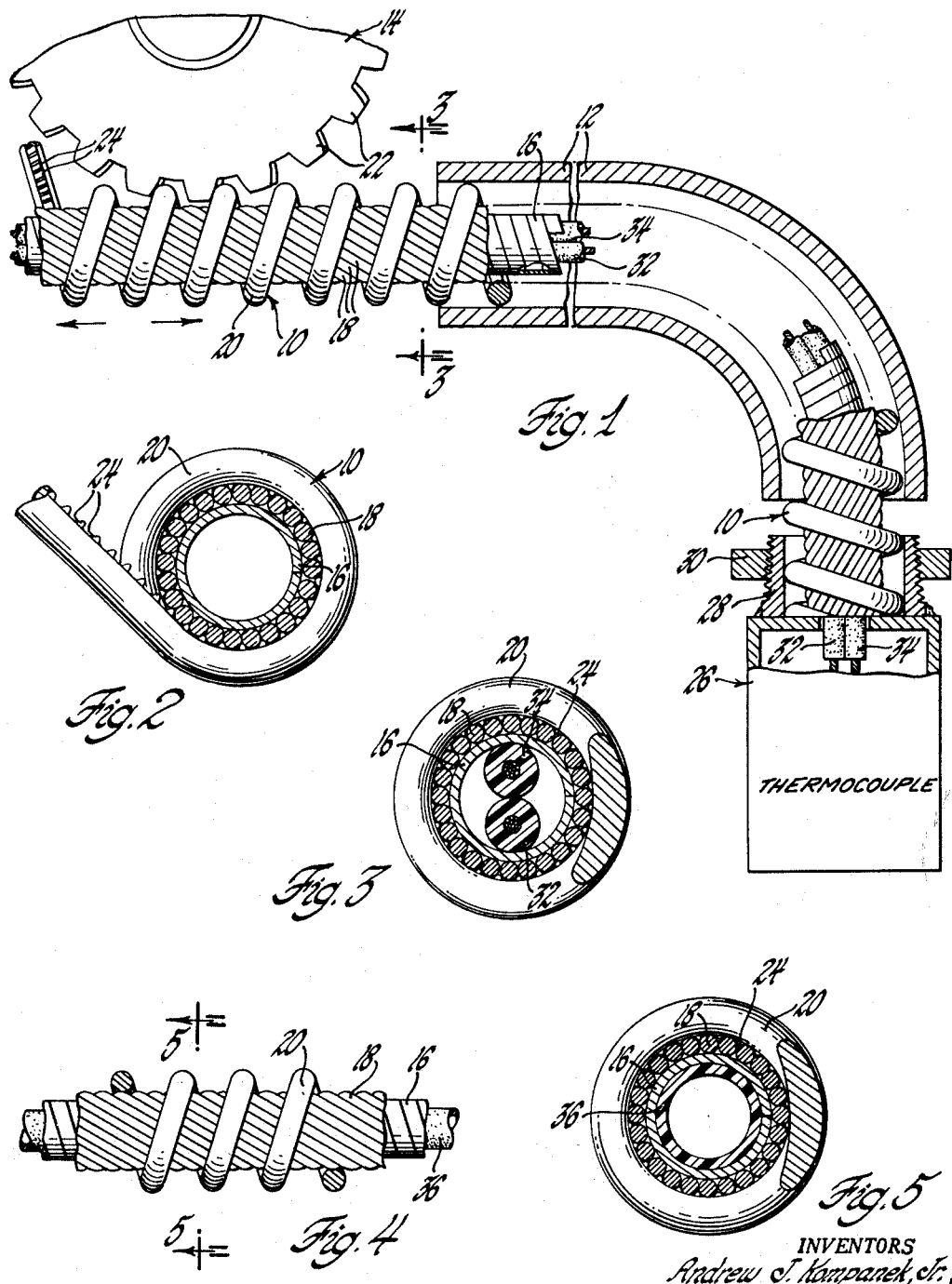

3,184,986
DRIVABLE HOLLOW CABLE
Andrew J. Kompanek, Jr., and Fred Machate, Lansdale, and George M. Zieber, Jr., King of Prussia, Pa., assignors to Teleflex Incorporated, North Wales, Pa., a corporation of Delaware
Filed Feb. 2, 1962, Ser. No. 170,720
6 Claims. (Cl. 74—422)

The present invention relates to a unique type of cable formed in such a way as to include an exteriorly convoluted wire member formed throughout the cable length and which member is adapted to coact with a gear type member so as to permit the cable to be driven or moved relative to a surrounding and fixed conduit means.

More specifically, the subject invention relates to a drivable cable member which includes components uniquely formed to provide a hollow cable interior within which further tube or electrical cable members are adapted to be supported for transmitting a flow of matter therethrough. The subject hollow drivable cable is constructed in such a way that any interiorly disposed electrical cable or tubular members are movable therewith but are subjected to essentially no tensile or compression loading.

The subject hollow cable is of general utility and the substantially load-free interiorly disposed wires or tubes may transmit electrical, pneumatic or hydraulic matter therethrough.

The present hollow drivable cable is to be clearly distinguished from hollow conduits the latter which are adapted to movably receive a cable element therewithin. Rather, the subject hollow cable construction is itself adapted to be movably disposed within such a hollow conduit while the cable non-movably retains within its hollow exterior non-load bearing members which are adapted to transmit matter therewithin.

While drivable cables are, in general, well known such elements have in the past been utilized so as to be directly connected to an operative element, e.g. a gear, lever, etc. to actuate some mechanism. On the other hand, the subject cable is not limited to actuation of a remote mechanism but instead, or in addition, may be used to position a condition sensing or matter transmitting member in relation to some source. The source in turn, is adapted to be remotely controlled or actuated in accordance with the condition sensed or matter transmitted.

For instance, in order to accurately control a heat source such as a furnace or atomic reactor, it is necessary that a sensing device be movable therewithin to indicate the interior temperatures of the heat source whereby the heat level of the latter may be accurately controlled. This type of control may be achieved by the variable positioning of a thermocouple which transmits a temperature-induced electric current through lead wires positioned within such a drivable cable. Inasmuch as such electrical lead wires are preferably not load transmitting members, it is imperative that the driving cable be designed in a way to transmit tension and compression loads which occur as a result of supporting the moving such a thermocouple or other device.

Similarly, it may be desired to transmit or circulate fluid within some remote body in a manner requiring that such fluid be introduced at or withdrawn from different points again requiring the use of a drivable cable member of a hollow construction such that the fluid medium may be transmitted therethrough.

It is, therefore, a general object of the present invention to provide a hollow cable member capable of withstanding tension and compression loads, adapted to interiorly support essentially non-load carrying matter transmitting members, and which cable also includes an exterior construction permitting a driving member to coact therewith to actuate said cable within a supporting conduit.

More specifically, the subject drivable hollow cable includes a helically coiled flat strip member adapted to withstand compression loading, a plurality of tension transmitting long lay wires wrapped about the more closely coiled strip member and an exteriorly disposed helical wire the convolutions of which are longitudinally spaced to grippingly engage the long lay wires and which exterior wire is adapted to coact with a driving member to impart movement to the cable.

Inasmuch as longitudinal movement of the subject cable occurs through the application of a longitudinally applied force through the outer helical wire member, it is also an object of the present invention to provide means for insuring good gripping engagement between said wire and the subadjacent long lay wires.

The details as well as other objects and advantages of the present invention will be apparent from a perusal of the detailed description which follows taken in conjunction with the drawings.

In the drawings:
FIGURE 1 is a schematic representation of a control system embodying the subject hollow-drivable cable;
FIGURE 2 is a view showing the outer driving wire partially unwound to illustrate the gripping surface formed thereon;
FIGURE 3 is a view along line 3—3 of FIGURE 1;
FIGURE 4 is a modification showing a non-load bearing tube within the subject cable;
FIGURE 5 is a view along line 5—5 of FIGURE 4.
Throughout the description like parts are indicated by the same identifying numbers.

Referring to FIGURE 1, the subject drivable cable member is indicated generally at 10 and is adapted to be longitudinally actuated, as indicated by the arrows, within a relatively fixed conduit 12. The longitudinal actuation of cable 10 may be achieved in any suitable manner as by a rotatable gear member 14 adapted to coact with the cable in a manner to be subsequently described.

Cable supporting conduit 12 may be of any suitable construction and may either be rigid or flexible in accordance with particular requirements but, at any rate, the conduit is normally non-movably mounted relative to any particular installation with which it is employed. Cable 10 is slidably supported upon the interior surface of conduit 12.

Cable 10 includes an inner coil member 16. Most preferably, inner coil member 16 is formed from a flat narrow strip member having a rectangular cross section and which is closely coiled with a very short helix such that the adjacent convolutions are normally abutting. As thus constructed, inner coil 16 is adapted to carry compression loading particularly as induced during longitudinal actuation of the cable.

Tension loads on the cable 10 are primarily withstood by a plurality of relatively long lay wires 18 laid about inner coil 16 on a relatively long helix. The number and closeness of long lay wires 18 is generally determined by the tensile loads to which the cable is to be subjected.

It is apparent that the closely coiled inner coil member 16 while able to withstand compression loading, due to the column strength realized through the longitudinally abutting nature of adjacent convolutions, would tend to stretch or uncoil in response to tension loads. On the other hand, the relatively small diameter long lay wires 18 have relatively little column or compression strength but, on the other hand, due to their long helix are able to withstand tension loading without significant uncoiling. Thus inner coil 16 and long lay wires 18 are closely wrapped together so as to conjointly withstand the compression and tension loads to which cable 10 is subjected.

A relatively heavy wire 20 is tightly coiled about long lay wires 18 on a short helix but in which the adjacent convolutions of the wire are longitudinally spaced. The space between the convolutions of wire 20 is generally determined by the size and spacing of the coacting members on the member adapted to drive cable 10. More specifically, the space between the wire convolutions in the illustration of FIGURE 1 is determined by the size of the teeth 22 on driving gear 14. As seen in FIGURE 1, as gear 14 is rotated adjacent teeth will move between adjacent convolutions of wire 20 to longitudinally drive cable 10.

Inasmuch as relatively high peripheral load forces may be transmitted from gear 14 to wire 20, the latter must be a relatively stiff or heavy member. Accordingly, cable driving wire 20 is preferably from two to three times the diameter of long lay wires 18.

At the same time, in order to insure accuracy in controlling the longitudinal movement and positioning of cable 10, it is important that the convolutions of wire 20 be equally and accurately spaced. To illustrate the importance of such equal and accurate spacing of the wire convolutions, let it be supposed that the space between one pair of convolutions was twice as much as the space between an adjacent pair of wire convolutions. In this event, as the teeth 22 of gear 14 move between the disparate spaces a certain amount of gear movement will not be translated into cable movement. In other words, there will be a limited amount of lost motion between the gear and the cable. It is further apparent that any such "slipping" between the driving member and the cable will result in an inaccurate positioning of the cable and the device which it controls. The manner and apparatus by which wire 20 is accurately laid about long lay wires 18 is shown and described in copending application P–313 Machate.

In order to maintain the convolutions of wire 20 equally spaced longitudinally of the cable, as well as to insure good gripping engagement between the wire and the subadjacent long lay wires 18 and to thereby prevent longitudinal displacement of wire convolutions when subjected to longitudinal loading by a cable driving member, such as gear 14, it has been found to be most advantageous to provide means for providing a kind of interlocking or interfering engagement between the abutting surfaces of the driving wire 20 and long lay wires 18. To this end, the inner surface of wire 20 adapted to abut subadjacent long lay wires 18 is formed with serrations or indentations 24 thereon as best seen in FIGURES 1 and 2. The manner in which such serrations are formed on the driving wire is also shown and described in the aforenoted copending application.

Serrations 24 are formed generally transversely of the longitudinal axis of wire 20. Thus, the inner surface of the driving wire has a "washboard" effect to interrupt the otherwise smooth character of such wire.

Thus as wire 20 is rolled or laid about long lay wires 18, serrations or indentations 24 tend to interlock with long lay wires 18 and thereby resist relative sliding movement between the wire convolutions and the subadjacent long lay wires. This type of interference fit or interlock occasioned by wire 20 being formed with the serrations, as described, is to be contrasted with the case where such an inner surface of wire is smooth and in which event it is relatively more easy for the wire to be displaced relative to the subadjacent long lay wires under the driving loads imposed by a driving member such as gear 14.

In an illustrated form of the subject invention as shown in FIGURE 1, a thermocouple device 26 is shown secured to one end of cable 10. In this case the thermocouple device may be clamped to and supported from the cable in any suitable manner such as through a tapered, externally threaded collar member 28 and a coacting nut 30 which clamps the thermocouple to the cable. Insulated lead wires 32 and 34 supported within cable 10 extend within thermocouple 26 and are essentially free of any compression or tension loads. Being thus free of alternate tension and compression loads, electrical lead wires 32 and 34 will be subjected to little or no wear and in this way greatly increasing the life of the system with which they are utilized.

Referring to FIGURES 4 and 5, in a similar manner, cable 10 may support a tubular member 36 therewithin in a non-load carrying condition in the event the cable were to be used in a situation where it is desired to transmit fluid materials therethrough.

It is apparent that many uses may be made of the drivable hollow cable constructed in accordance with the abovedescribed invention.

We claim:

1. A hollow drivable cable adapted to be movably supported within a conduit, said cable comprising a flat closely coiled inner member the adjacent convolutions of which are adapted to be in abutting relationship, a plurality of wire members laid about said inner coil with a relatively long helix, a stiff wire element tightly wrapped about said plurality of wire members and in a direction opposite to the lead of said plurality of wire members, the diameter of said wire element being at least twice the diameter of any one of said plurality of wire members, the adjacent convolutions of said wire element being equally spaced longitudinally of said cable, said wire element being adapted to transmit a longitudinal driving force to said cable, said wire element including an inner surface adapted to contact a portion of the outer surfaces of said plurality of wire members, one of said contacting surfaces being formed to provide an interlocking contact between said wire element and said plurality of wire members tending to resist relative longitudinal movement between said wire element and said plurality of wire members during the application of said longitudinal driving force to said wire element.

2. A hollow drivable cable as set forth in claim 1 in which the surface of said wire element contacting said plurality of wire members is deformed so as to form a discontinuous surface to provide said interlocking contact between said wire element and said plurality of wire members.

3. A hollow drivable cable as set forth in claim 2 in which the surface of said wire element contacting said plurality of wire members comprises a plurality of serrations extending transversely of the longitudinal axis of said wire element.

4. A hollow drivable cable as set forth in claim 1 which includes a device secured to one end of and supported by said cable, and matter transmitting means supported within said closely coiled inner member for movement with said cable, said means being operatively connected to said device in a load-free relationship, tension and compression loads being carried by the plurality of long helix wire members and the closely coiled inner member.

5. A hollow drivable cable as set forth in claim 4 in which the surface of said wire element contacting said plurality of wire members is deformed so as to form a discontinuous surface to provide said interlocking contact between said wire element and said plurality of wire members.

6. A hollow drivable cable as set forth in claim 5 and which includes a gear element adapted to coact with the convolutions of said wire element to drive said cable.

(References on following page)

References Cited by the Examiner

UNITED STATES PATENTS

| | | | |
|---|---|---|---|
| 1,951,723 | 3/34 | Burd et al. | 74—501 |
| 2,187,873 | 1/40 | Bratz | 74—501 |
| 2,725,713 | 12/55 | Blanchard. | |
| 2,998,696 | 9/61 | Payer | 57—145 |

FOREIGN PATENTS

| | | |
|---|---|---|
| 717,945 | 10/31 | France. |
| 740,318 | 11/32 | France. |
| 437,194 | 10/35 | Great Britain. |
| 870,683 | 6/61 | Great Britain. |
| 607,496 | 8/60 | Italy. |

DON A. WAITE, *Primary Examiner.*
BROUGHTON G. DURHAM, *Examiner.*

UNITED STATES PATENT OFFICE
CERTIFICATE OF CORRECTION

Patent No. 3,184,986                                  May 25, 1965

Andrew J. Kompanek, Jr., et al.

It is hereby certified that error appears in the above numbered patent requiring correction and that the said Letters Patent should read as corrected below.

Column 1, line 63, for "the" read -- and --.

Signed and sealed this 5th day of October 1965.

(SEAL)
Attest:

ERNEST W. SWIDER                            EDWARD J. BRENNER
Attesting Officer                                Commissioner of Patents